United States Patent [19]

Wilkes

[11] Patent Number: 4,624,028
[45] Date of Patent: Nov. 25, 1986

[54] OMNIDIRECTIONAL ROLLING SUPPORT HAVING CASTERING INDUCED BY ROTATIONAL RESISTANCE

[75] Inventor: Donald F. Wilkes, Albuquerque, N. Mex.

[73] Assignee: Vern Heinrichs, Toronto, Canada; In Trust

[21] Appl. No.: 692,637

[22] Filed: Jan. 22, 1985

[51] Int. Cl.$^4$ .............................................. B60B 33/00
[52] U.S. Cl. ........................................ 16/18 B; 16/21; 16/48
[58] Field of Search ................. 16/18 R, 18 B, 20, 21, 16/45, 46, 47, 48

[56] References Cited

U.S. PATENT DOCUMENTS

| | | | |
|---|---|---|---|
| 314,961 | 3/1885 | Mendenhall | 16/48 |
| 343,725 | 6/1886 | Pederson . | |
| 348,052 | 8/1886 | Pleukharp | 16/47 X |
| 696,499 | 4/1902 | Schaibly . | |
| 978,161 | 12/1910 | Holmes | 16/46 X |
| 1,106,853 | 8/1914 | Smouse | 16/48 |
| 1,622,447 | 3/1927 | Kalberer . | |
| 1,743,255 | 1/1930 | Vervoort | 16/21 |
| 1,839,396 | 1/1932 | Kimball . | |
| 1,929,050 | 10/1933 | Bender | 16/21 |
| 2,073,066 | 3/1937 | Kalberer | 16/18 R |
| 2,560,562 | 7/1951 | Ferwerda . | |

FOREIGN PATENT DOCUMENTS 861883 3/1961 United Kingdom .................. 16/47

OTHER PUBLICATIONS

Colson, Mini-Catalog 833, p. 2.

*Primary Examiner*—Fred Silverberg
*Attorney, Agent, or Firm*—Burns, Doane, Swecker & Mathis

[57] ABSTRACT

A rolling support system has a pair of wheels mounted for rotation about a first axis with bearings that have a first resistance to rotation of the wheels. A stem assembly includes a portion to which the first axis is attached and further includes a thrust bearing having a second resistance to rotation. The second resistance to rotation being lower than the first resistance to rotation so that during movement of the system, the first resistance to rotation is effective to move the wheels into alignment with the direction of travel. To reduce noise as well as to reduce potential damage to an underlying surface, the periphery of each wheel may include a tire.

9 Claims, 4 Drawing Figures

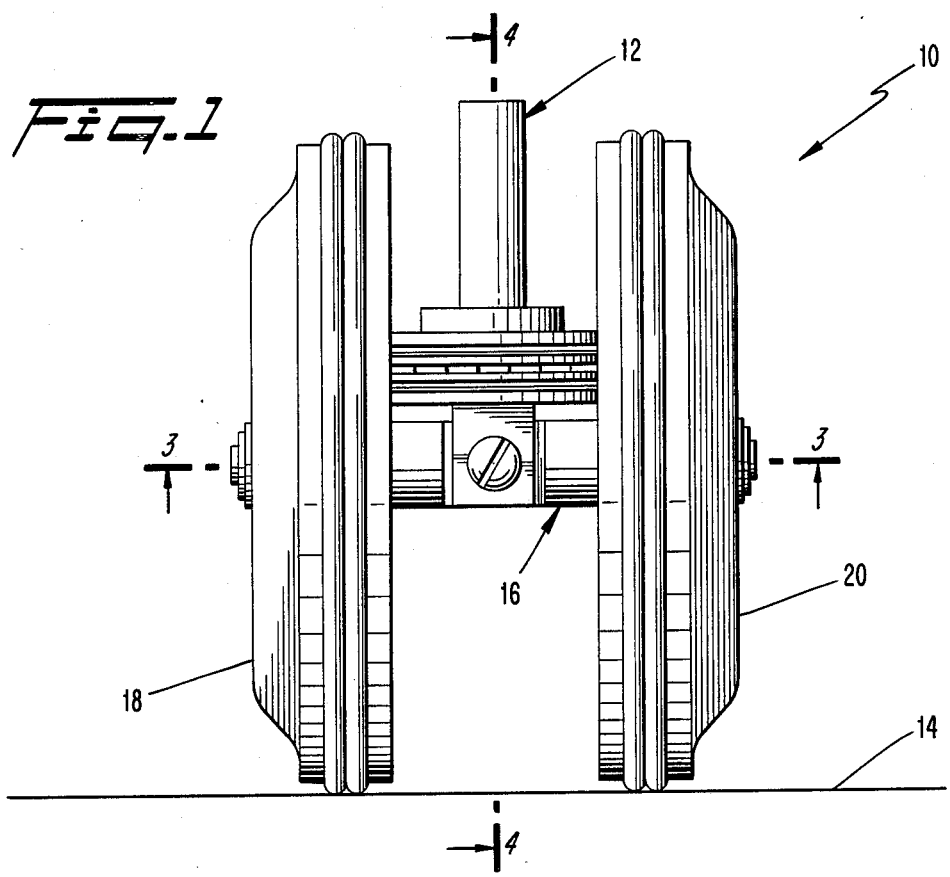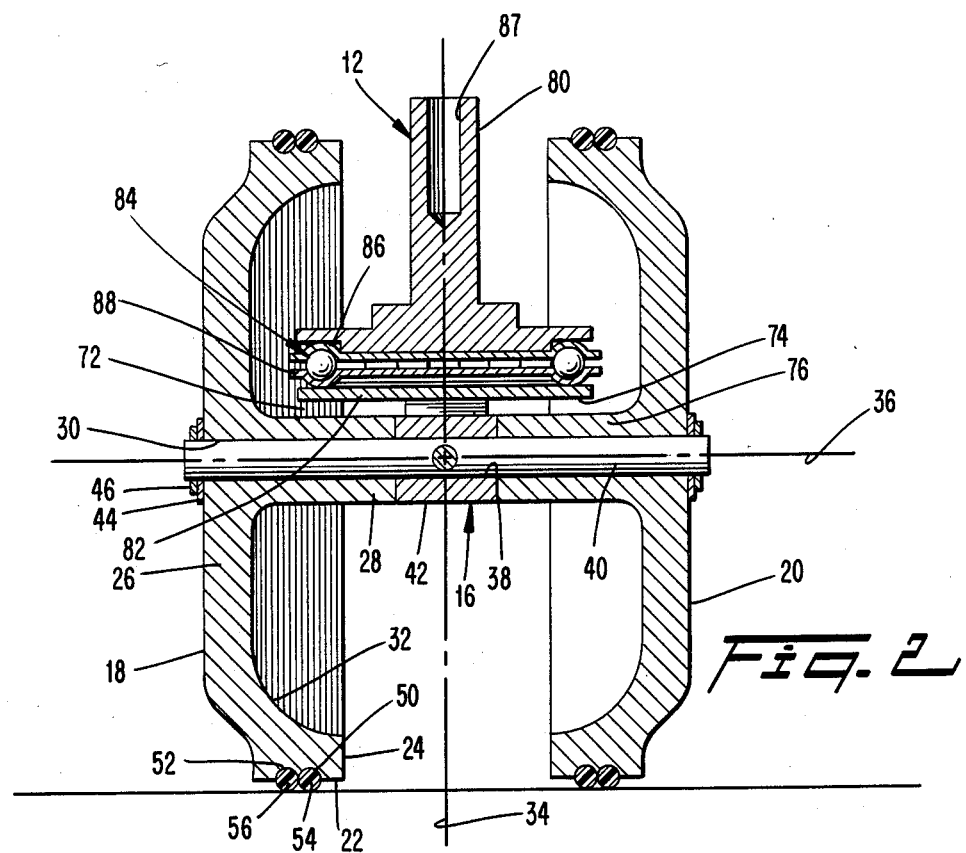

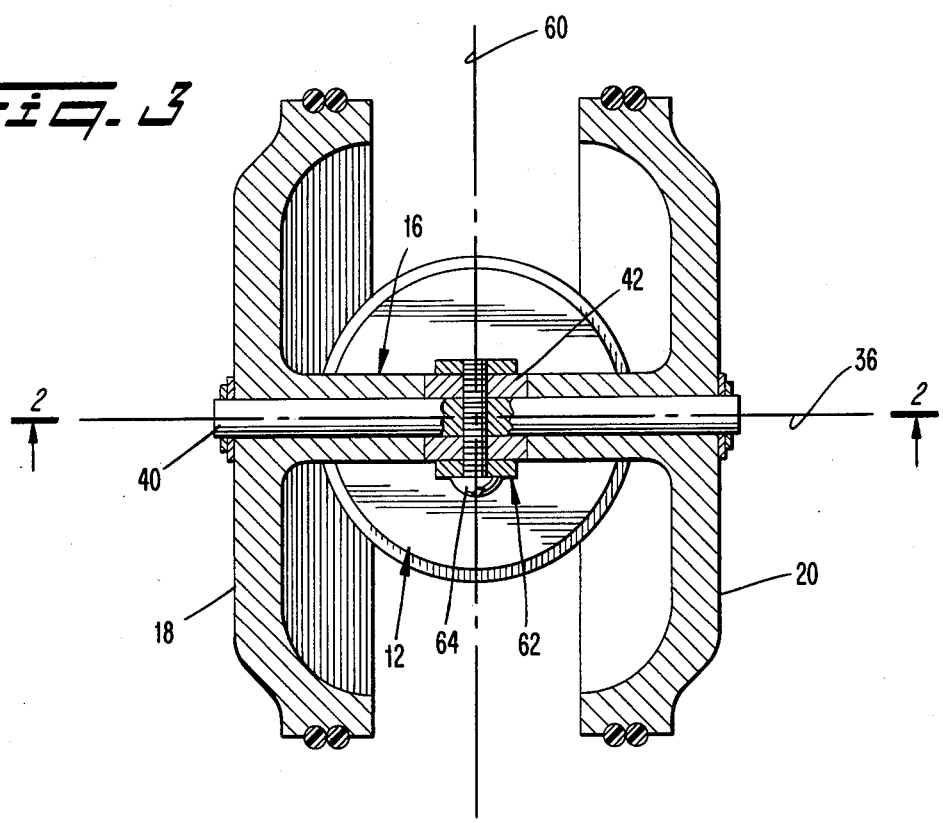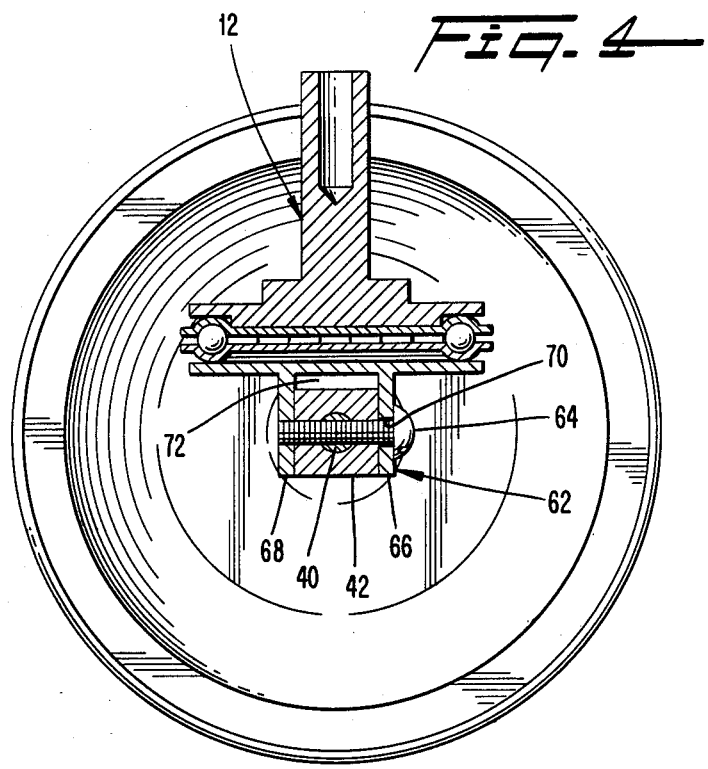

OMNIDIRECTIONAL ROLLING SUPPORT HAVING CASTERING INDUCED BY ROTATIONAL RESISTANCE

BACKGROUND OF THE INVENTION

The present invention relates generally to an omnidirctional rolling support. More particularly, this invention concerns a caster for supporting moveable objects.

Throughout the better part of a century, people have been using casters positioned on the bottom of heavy objects to facilitate moving those objects from one place to another. Generally, the casters are intended to permit the object to be rolled in any direction that may be desired so that effort need not be expended to lift the object. The ability to permit movement in a large number of different directions is typically accomplished by mounting a wheel for rotation on a horizontal axis and then mounting that horizontal axis axis of rotation so that it is horizontally displaced from a vertical axis by means of which the device is attached to the heavy object. When the object is pushed in a horizontal direction, the horizontal offset establishes a force couple that causes the wheel to trail the object in its direction of movement in response to the force resulting from the horizontal push. This alignment of the wheel in a position following the direction of travel is a castering action.

In order to improve the castering function of such devices, a bearing assembly is sometimes provided which reduces the frictional resistance to movement about a vertical axis. When a ball bearing is used in this environment, the horizontal offset of the axis of the wheel from the vertical axis of the bearing imposes a force moment on the ball bearing which places one or perhaps two of the bearing balls under a force loading which corresponds to the entire weight of the object being supported. Imposition of this force loading on the one or two bearing balls, rather than distributing the force load on all of the bearing balls, leads to premature wearing out of the ball bearing assembly, and sometimes to premature failure of individual bearing balls. As a result, the imbalance or lack of symmetry in the force loading is seen to be a problem leading to reliability and failure concerns.

Another problem with known caster assemblies is their use of relatively small diameter wheels. Small diameter wheels essentially increase the local bearing pressure on the underlying surface. Such increased bearing pressure causes marring of wood floors and resilient flooring materials such as vinyl and the like. And, where the caster assembly is used to support an object on a floor which is covered with a high or medium height pile, the small diameter of the wheel contributes to a substantial increase in the effort needed to move the object.

Moreover, it has been observed that probably the most common use which caster assemblies are required to provide is the ability to reverse direction of movement. This is the movement which is required for example when a homeowner pulls a refrigerator out of its normal position in a kitchen for cleaning purposes and then returns the refrigerator to that normal position. Similarly, when a desk chair is rolled under a desk, the most common movement is a reversal of direction to permit the chair and its occupant to move backwardly and away from the desk. Where the caster assembly is required to undergo a direction reversal, the horizontally offset wheel must pivot about the vertical axis through a direction of 180 degrees. When four or more independent wheels experience that angular change, erratic movement of the object from side to side frequently occurs. As a result, it is difficult to position and withdraw an object on caster from spaces which do not provide adequate lateral clearance.

Another problem which is sometimes encountered when using known caster assemblies concerns the presence of imperfections in the horizontal surface supporting the caster assembly. Slight inclinations and slight vertical offsets in the underlying surface can, and often do, cause damage to the edge of the caster wheel. Such damage can lead to sharp broken edges that can seriously damage the underlying surface.

One known caster assembly includes a wheel contained in a cage so as to be moveable between two positions, each of which is horizontally offset from the vertical axis of support. In moving between these two positions during reversal of direction, the vertical load being supported is transferred to the periphery of the wheel. See, U.S. Pat. No. 1,839,396, issued to Kimball on Jan. 5, 1932. A similar device is known in which a pair of wheels are mounted on an axle which in turn is moveable between two positions. Movement of the axle permits the caster device to move and reverse directions on a straight line. Vertical forces are supported by a pair of bearing wheels, only one of which for the reasons discussed supports the vertical load. See, U.S. Pat. No. 343,725, issued to Pederson on June 15, 1886. Such devices, however, apply the unbalanced force moments to the bearing elements so that those elements are subjected to unusually rapid wear and failure.

A caster assembly is also known in which the wheel is mounted by a spherical bearing in such a manner that the yoke carrying the wheel or wheels is inclined relative to the vertical direction in a vertical plane perpendicular to the horizontal axis of the wheel. That inclination provides the horizontal offset which generates the castering action. And, the horizontal axis of the wheel is also permitted some freedom to tilt in the vertical direction. See, U.S. Pat. No. 2,560,562 issued to Ferwerda on July 17, 1951. The ability of a caster assembly to accomodate movement of its horozontal axis in a vertical plane is also known in more conventional devices in which the vertical axis is horizontally displaced from the axis of the wheel. See, U.S. Pat. No. 1,622,447 issued to Kalberer on Mar. 29, 1927.

It is also known to use a tire in connection with a caster assembly where the horizontal axis about which the wheel rotates is displaced horizontally from the vertical axis about which the caster is free to move. See, U.S. Pat. No. 696,499 issued to Schaibly on Apr. 1, 1902.

SUMMARY OF THE INVENTION

To overcome problems of the type discussed above, a caster assembly according to the present invention is arranged so that there is a symmetrical application of force loadings on the assembly so that all elements can be efficiently utilized. In addition, a caster in accordance with the present invention attains the castering action through a difference in the resistance to rotational movements between ball bearings and journal bearings rather then a reliance on the use of horizontally offset vertical and horizontal axes of rotation.

In the present invention, the vertical axis about which the rolling support assembly is free to rotate is positioned so as to intersect the horizontal axis about which the wheels rotate. In this manner the unbalanced vertical forces are avoided which lead to inefficient utilization of ball bearing elements and which lead to premature failure of those same elements.

To effect the castering action, a pair of horizontally spaced wheels are provided, each of which is mounted by a journal bearing for rotation about the horizontal axis. In this fashion, the slightly greater friction of the journal bearings causes the wheel assembly to rotate about the vertical axis as permitted by the ball bearing assembly to the necessary direction of movement. Moreover, when the direction of movement for the rolling support assembly is reversed, there is no need for the wheel assembly to rotate through an angle of 180 degrees and there is no need for the wheel assembly to move from a first to a second position.

To permit the rolling support assembly to accomodate perturbations in the height of the underlying surface, the horizontal axis about which the wheels rotate can itself be mounted to permit limited movement in a vertical plane. That limited vertical movement can be effected simply by using a screw, a threaded fastener or a pin that provides a pivot axis.

Where it is also desired to limit the possibility of damage to underlying surfaces, or where it is desired to reduce the noise associated with movement of the caster assembly across a surface, tires can be provided on the peripheral surface of the wheels.

BRIEF DESCRIPTION OF THE DRAWINGS

Many objects and advantages of the present invention will be apparent to those skilled in the art when this application is read in conjunction with the attached drawings wherein like reference numerals are attached to like elements and wherein:

FIG. 1 is a front elevational view of an omnidirectional rolling support according to the present invention;

FIG. 2 is a cross-sectional view taken along the line 2—2 of FIG. 4;

FIG. 3 is a cross-sectional view taken along the line 3—3 of FIG. 1; and

FIG. 4 is a cross-sectional view taken along the line 4—4 of FIG. 2.

DESCRIPTION OF THE PREFERRED EMBODIMENT

Turning now to FIG. 1, an omnidirectional rolling support 10 or caster is illustrated. The caster includes a centrally disposed stem means 12 for connection or attachment to an object (not shown) that is to be supported above an underlying support surface 14. While there are a myriad of objects that can be supported by a caster according to the present invention, such things as desk chairs, furniture, and equipment are examples of the objects for which the present invention can be used. Ordinarily, one or more casters along with other wheels or support members will be used to support an object as is the case with conventionally known casters. And, each caster supports a corresponding portion of the weight of the object.

The portion of the object's weight carried by each caster 10 is transmitted through the stem means 12 to an axle means 16. From the axle means 16, the weight is transmitted to a pair of wheels 18, 20 and then to the underlying surface 14. If desired, a friction reducing sleeve 21 may be provided between each wheel 18, 20 and the axle means 16. Delrin is a suitable sleeve material.

Since the wheels 18, 20 are identical to one another, it will suffice to describe one of the wheels in detail, it being understood that the other wheel has the same features. Thus the wheel 18 includes a peripheral surface 22 which may be generally cylindrical. The length of the cylindrical surface is selected so that there is a sufficient surface area between the peripheral surface and the underlying surface 14 to transmit the portion of the object's weight supported by the wheel 18 with acceptable bearing stresses on both the wheel 18 and the underlying surface 14.

Due to the compact external envelope permitted by a caster 10 according to the present invention, the diameter of the wheel 18 is selected to be as large as desired. At this point is should be noted that the wheel diameter for the wheel 18 exceeds the wheel diameter available on conventional casters designed to carry the same weight or vertical force load. This increase in available wheel diameter is made possible by the placement of the axle means 16 in close proximity to the lower end of the stem means 12. In conventional caster systems, the entire diameter of the wheel must be located beneath the object being supported. Thus to support an object at the same height above the underlying surface 14, a caster according to the present invention could provide a wheel having a diameter as much as twice that of earlier known devices.

This increased diameter permits the caster 10 to roll more easily over perturbations in the height of the underlying surface 14. Moreover, where the caster is used on carpeted surfaces, the larger diameter of the wheel 18 reduces the force which must be exerted to move the object being supported. This reduced resistance to rolling over vertical perturbations can be explained by considering the longer moment arm between the center of rotation and the underlying surface which results from increases in wheel diameter. With a longer moment arm, a smaller lateral force is needed to displace the wheel along the underlying surface where the vertical force or load remains constant.

The peripheral surface 22 of the wheel 18 is located on a rim portion 24 (FIG. 2) which is preferably integral with a disc portion 26 and a hub portion 28. In the preferred form, the rim portion 24, the disc portion 26, and the hub portion 28 are fabricated from metal to obtain good strength characteristics. While the disc portion 26 of the wheel is illustrated as being imperforate, there may be situations where it is desired to provide openings through the disc portion 26 or to provide an ornamental design thereon for aesthetic reasons.

At the center of the wheel 18 is the hub portion 28. Preferably the hub portion does not protrude beyond an plane generally defining the outer limit of the disc portion 26. In this fashion, the hub portion does not add to the lateral width of the caster 10. The hub portion 28 does, however, project inwardly toward the center of the caster 10 and away from the disc portion 26 of the wheel 18. Extending through the hub portion 28 is a generally cylindrical bore 30 which serves as a journal bearing for the wheel 18. The overall length of the hub portion 28 is selected so that the hub portion can transmit the vertical load to the wheel itself without experiencing excessive stresses.

The surface 32 of the wheel 18 facing the central part of the caster 10 is undercut between the rim portion 24 and the hub portion 28. This construction provides additional room to accommodate radially protruding portions of the stem assembly 12. By providing this room, the wheel 18 can be positioned closer to a vertical plane of symmetry 34 passing through the center of the caster 10. As a result the overall width of the caster can be reduced.

In the peripheral surface 22 of the wheel 18, a pair of grooves 50, 52 are provided. Each groove 50, 52 extends circumferentially around the wheel 18 and has an arcuate cross section. That arcuate shape of the groove cross section conforms to the external shape of a corresponding tire means 54, 56 which is partially received by and retained by the groove means. The tire means if preferably made from a suitably sized O-ring made of, for example, rubber, neoprene, or other suitable conventional materials. The O-ring provides an inexpensive, resilient tire than can be easily be replaced if and when necessary. The tire means is effective to space the peripheral surface of the wheel 18 from the underlying support surface during operation of the caster thereby substantially reducing or even eliminating the risk for damage to the surface from the rim portion 24. Moreover, the resilient nature of the tire means is effective to seriously reduce noise that can be generated during movement of a metal caster wheel over another hard surface.

Each of the wheels 18, 20 is mounted on a corresponding end portion of the axle means 16. The axle means may include a generally cylindrical metal shaft 40 having a first, or horizontal, axis. The shaft 40 is received by a cylindrical bore 38 of a metal sleeve 42. This sleeve 42 may be generally rectangular in cross-sectional shape (FIG. 4). To maintain symmetry in the caster 10 (FIG. 2), the shaft 40 preferably projects by essentially the same distance from each end of the sleeve 42. For proper operation of the invention, it is desired that the shaft 40 be fixed relative to the sleeve 42 so that there is no relative motion therebetween. In this regard, the shaft 40 and the sleeve 42 could be fashioned as one integral piece and still be within the spirit and scope of this invention.

So that the ends of the shaft 40 will protrude beyond the wheels 18, 20, the length of the shaft 40 is preferably greater than sum of the axial length of the sleeve 42 plus twice the axial length of a wheel taken along the bore 30. After the wheel is placed on the corresponding end of the shaft 40, a suitable conventional thrust washer 44 is placed on the shaft end. A suitably conventional retaining ring 46 is then applied to the shaft end to hold the wheel 18 on the shaft 40. This structure also amounts to a journal bearing mounting the wheel 18 to the shaft 40 so that the wheel is rotatable about the first axis 36.

As with all bearing, the journal bearing between the wheel 18 and the shaft 40 has a resistance to rotation. This resistance is primarily due to the friction between the wheel and the shaft.

The axle means 16 is pivotally mounted to the lower end of the stem means 12 so as to have limited rotational movement about a pivot axis which lies in the plane of symmetry 34. As best seen in FIG. 3, the pivot axis 60 extends transversely to the shaft 40 and is generally perpendicular to the first axis 36. The pivot axis 60 is defined in part by a tilt pivot means such as a pivot pin 64 which may for example be a threaded fastener that extends through a bore in a leg of a yoke means 62, into a correspondingly threaded hole of the sleeve 42, and finally into engagement with the shaft 40. With this arrangement, the pivot pin 64 prohibits relative rotation of the shaft relative to the sleeve 42 while it provides a pivot for the axle means relative to the stem means 12 (FIG. 4).

The yoke means 62 includes a pair of generally parallel legs 66, 68 which extend from the lower end of the stem means 12. These legs 66, 68 are spaced from one another by a distance sufficient to receive the sleeve 42 of the axle means 16 therebetween. The bore 70 in the leg 66 through which the pivot pin 64 passes is preferably located so that there is a clearance 72 between the sleeve 42 of the axle means 16 and the adjacent surface of the stem means 12. This clearance 72 (FIG. 2) is proportioned so that engagement between the edge 74 of the stem means 12 and the outside surface 76 of the wheel hub portion limits the range of movement of the axle means in the plane containing the first axis and the stem axis. Preferably, the axle means 16 is permitted to move through an angle of $+/-15$ degrees relative to the position of the first axis 36 shown in FIG. 2.

Turning now to the stem means 12, a first upper portion 80 is provided which is operable to be attached or connected to the object to be supported by the caster 10. To this end, the first portion 80 may be shaped so as to be generally cylindrical and shown so that it can be received in a bore of the object. The upper portion may also include an axially extending hole 81 that can be adapted to receive a threaded fastener attached to the bottom of the object to be supported. Preferably the upper portion as well as the lower portion are fashioned from metal.

At the lower end of the upper portion is a thrust bearing 84 which preferably is a ball bearing having an upper race 86 attached to the upper portion 80, a lower race 88 attached to a second or lower portion 82, and a plurality of spherical bearing elements. The thrust bearing thus allows the upper portion 80 and the lower portion 82 of the stem means 12 to rotate relative to one another through an angle of more than 360 degrees. In addition, the thrust bearing offers a second resistance to relative rotation of the upper and lower portions by virtue of its internal friction. However, since the internal friction exhibited by a ball bearing is considerably less that the internal friction exhibited by a journal bearing, the second resistance to rotation is much less than the first resistance to rotation. This difference in relative resistance to rotation is important in the castering action which is provided in the present invention.

The thrust bearing 84 on the vertical axis (i.e., the ball bearing) has a coefficient of friction which is about 1/10 the coefficient of friction for the journal bearing between the wheel 18 and the shaft 40. While the effect of that difference in relative resistance to rotation is not fully understood at the present time, the discussion below explains what is believed to occur.

OPERATION

In use, the caster according to the present invention is attached to the bottom of an object to be supported. That attachment may, for example, be by inserting the generally cylindrical upper portion of the stem means 12 into a correspondingly sized bore of the object or by any other suitable method.

Typically, where the object has legs, one caster will be provided for each leg. Where the object does not have legs, then at least one caster is positioned at the bottom surface to support the object along with other rolling supports.

With the caster in position, the weight of the object is divided among the various casters and other supports according to the classical laws of statics. The weight or vertical load supported by each caster is transmitted through the upper portion of the stem means 12 through the ball bearing 84 to the lower portion 82 of the stem means 12.

From the lower portion, the vertical load is transmitted through the yoke means 62 (FIG. 4) and the pivot pin 64 to the axle means 16. The axle means 16, in turn, divides the vertical load between the two wheels 18, 20 which transmit the load to the underlying support surface 14.

During rolling movement of the caster, when the lateral force is applied completely in the plane of symmetry, the wheels 18, 20 simply roll in the direction they are being pushed. If the direction of the lateral force is reversed and if it still remains within the plane of symmetry, then the wheels 18, 20 simply roll in the opposite direction. Thus, there is no need for the caster to undergo the 180 degree direction reversal which is common with most prior art caster assemblies.

In the situation where the applied lateral force includes a component normal to the plane of symmetry, then the difference between the resistance to rotation of the ball bearing relative to the resistance to rotation of the journal bearings comes into active interplay. In response to such forces, the greater resistance of the journal bearings causes the axle means 16 to rotate about the axis of the stem means to assume a position where the wheels 18, 20 are aligned with the direction of travel. Thus, the castering function is provided by the difference in the resistance of rotation provided by the different types of bearing used and the reduced rolling resistance of the wheels when they are rolling straight ahead.

While the precise mechanism by which the castering action is accomplished is not fully understood, it is believed that the castering action can be described from the following discussion. Where a force is applied in the plane of symmetry 34 (FIG. 2) of the assembly, the assembly simply rolls in the direction of the applied force. However, when a force is applied which includes a component normal to the plane of symmetry, that normal component is reacted along the horizontal axis 36. Essentially, that normal component is applied to the horizontal axis at the pivot pin 64 (FIG. 3). For the sake of this discussion, it is assumed that the normal component is applied from left to right in FIG. 2 along the axis 34. The normal force is balanced by the friction between the wheels 18, 20 and the underlying surface 14. But the wheel and axle assembly is free to rotate about the pivot pin in the plane of FIG. 2. The normal component of the applied force results in a shift of a portion of the static load carried by the wheel 18 to the wheel 20. As a result, there is a higher frictional force acting on wheel 20 than on wheel 18. This unbalanced force results in a force moment that moves the wheel and axle assembly toward perpendicularity with the plane of symmetry. Moreover, as the wheel and axle assembly approaches perpendicularity to the plane of symmetry, the unbalanced force moment decreases toward zero. As a result, the castering action occurs.

It is also noted that the castering action of the present invention was not achieved when the axle was permitted to rotate. This can possibly be explained by the more uniform distribution of the unbalanced force along the axle means when the axle itself is permitted to rotate.

It is estimated that the assembly using tire means is about 80 times easier to roll in a straight direction in the plane of symmetry compared to the ability to slide perpendicular to the plane of symmetry. In this connection, it is noted that ratio of the journal bearing radius to the wheel radius is about 1/16 while the ratio of the coefficient of friction for the thrust bearing to the minimum coefficient of friction between the tire and the surface is about 1/5. (The coefficient of friction for the thrust bearing is on the order of 0.2; whereas the coefficient of friction between rubber and the underlying support surface is on the order of 1-3.)

The caster according to the present invention is also much greater than those casters without tires. Furthermore, the presence of the resilient tires permits the caster to be used on surfaces that would otherwise mar easily from the metal wheels.

And due to the compact envelope for the caster assembly, the wheels are larger which reduces the amount of effort that must be exerted to move the caster over resistances such as carpet pile, and vertical obstructions.

Furthermore, the symmetrical arrangement of the caster components virtually eliminates the force moments in a plane perpendicular to the stem axis which formerly were reacted through the thrust bearing and the connection to the object being supported. Here, the absence of force moments in that generally horizontal plane causes the vertical load acting on the stem means to be shared equally be all of the spherical bearing elements. As a result, inexpensive thrust bearings can be used with assurance that they will enjoy a long useful life in the caster without premature failure of the bearing or any of its elements.

Where desired, it is also possible to use the caster of the present invention with its vertical axis slightly inclined in the plane of symmetry. For example, it has been observed that the axis can be inclined by as much as 6 degrees from vertical without affecting the castering action. Thus the caster of the present invention is essentially insensitive to perpendicularity of the axis relative to the underlying support surface. This is in distinction to known casters which are quite sensitive to the vertical orientation of the rotational axis and which are unstable if the caster becomes slightly inclined.

In addition, it has been observed that the caster according to the present invention will also operate if the two wheels are not of equal diameter. For example, the caster behaves properly if the tire means is omitted from one of the wheels which could be a diametrical difference of 0.150 inches between the two wheels.

It should now be apparent that an omnidirectional rolling support has been described which overcomes the problems associated with known caster assemblies. Moreover, it will be apparent to those skilled in the art that there are numerous modifications, variations, substitutions and equivalents for features of the invention described above in connection with the preferred embodiment. Accordingly, it expressly intended that all such modifications, variations, substitutions and equivalents falling within the spirit and scope of the appended claims be embraced thereby.

What is claimed is:

1. A rolling support assembly for an object comprising:

a pair of wheels, each being mounted by a corresponding wheel bearing for rotation about a first horizontal axis, the wheels being spaced from one another along the horizontal axis;

stem means for connecting the wheels to an object, the stem means including a first portion for connection to the object, a second portion for connection with the horizontal axis, and a thrust bearing connecting the first and second portions so that the first and second portions are rotatable about a vertical axis which intersects the horizontal axis between the wheels, said second portion including symmetrically extending portions;

a separate member having a longitudinal axis aligned with the horizontal axis and being pivotally connected between said extending portions for rotation about a second horizontal axis which is perpendicular to the first horizontal axis and which intersects the first horizontal axis; and each of the wheel bearings having a first resistance to rotation, the thrust bearing having a second resistance to rotation, the second resistance being less than the first resistance, and the difference between the first and second resistances to rotation being operable to cause castering of the wheels to align them with the direction of movement.

2. The rolling support assembly of claim 1 wherein the first and second portions of the stem means are rotatable through an angle of 360 degrees.

3. The rolling support assembly of claim 2 wherein the first horizontal axis is provided by an axle which is fixed against rotation about that first horizontal axis.

4. The rolling support assembly of claim 1 wherein the stem means limits movement of the first horizontal axis in a vertical plane which is perpendicular to the vertical plane containing the first horizontal axis so that the rolling support assembly is capable of accommodating vertical perturbations in an underlying support surface.

5. The rolling support assembly of claim 1 wherein each of the wheels is provided with a resilient tire means that avoids contact between the surface of the wheel and an underlying support surface.

6. The rolling support assembly of claim 5 wherein each wheel includes a peripheral surface having a groove therein, and wherein the tire means comprises an O-ring received in that groove, the O-ring being free to move around the groove in response to forces acting on the O-ring during movement of the rolling support assembly.

7. The rolling support assembly of claim 1 wherein each of the wheel bearings is a journal bearing and wherein the thrust bearing is a ball bearing.

8. A rolling support assembly for an object comprising:

an axle having an axis and a pair of end portions;

a pair of wheels, each wheel being mounted on a corresponding journal bearing, each journal bearing having a first resistance to rotation of the corresponding wheel;

yoke means for pivotally mounting the axle about a transverse axis which is generally perpendicular to the axis of the axle and which intersects the axis of the axle, said yoke means including portions extending symmetrically relative to a support axis;

a separate member with a longitudinal axis aligned with the axis of the axle, pivotally connected to the yoke means about the transverse axis;

stem means for connection with the object, including a first portion attachable to the object, a second portion to which the yoke means is connected, and a ball bearing assembly which permits the first portion and the second portion to be freely rotatable relative to one another about the support axis, the ball bearing assembly having a second resistance to rotation which is lower than the first resistance to rotation, the support axis intersecting the axis of the axle and the transverse axis and being in a vertical plane with the transverse axis; and the rolling support assembly providing a symmetrical force loading on the object being supported, essentially free of force couples in the plane of the support axis and the transverse axis.

9. The rolling support of claim 8 wherein each wheel has a peripheral surface and includes a tire mounted on that peripheral surface to space the peripheral surface from an underlying support surface.

* * * * *